UNITED STATES PATENT OFFICE.

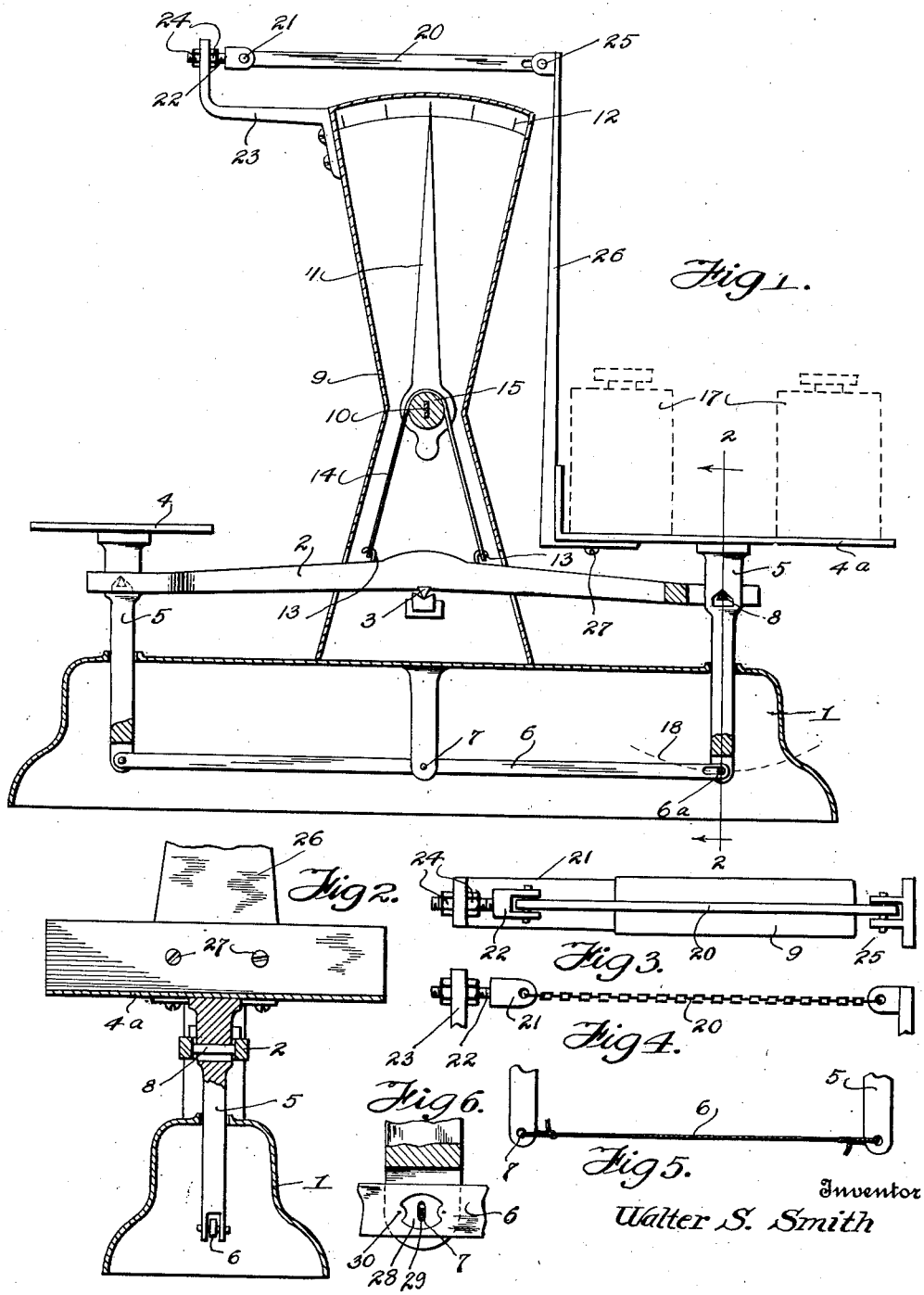

WALTER S. SMITH, OF COLUMBUS, OHIO, ASSIGNOR TO THE SMITH SCALE COMPANY, OF COLUMBUS, OHIO, A CORPORATION OF OHIO.

SCALE.

1,410,614.  Specification of Letters Patent.  Patented Mar. 28, 1922.

Application filed March 19, 1920. Serial No. 367,068.

*To all whom it may concern:*

Be it known that WALTER S. SMITH, a citizen of the United States, residing at Columbus, in the county of Franklin and State of Ohio, has invented certain new and useful Improvements in Scales, of which the following is a specification.

This invention relates to scales and is particularly directed to that type of weighing apparatus wherein a check rod structure is employed to maintain either the weight receiving pan or pans in proper functioning position. In all types of scales, wherein a check rod structure is used, this check rod structure may be thrown out of its true equilibration state by the application of a load upon either one of the weight receiving pans except in the case where the load is placed in exact vertical alignment with the pivotal connection of the pan with the beam. This latter condition is almost a physical impossibility and, as a result, my invention contemplates a structure wherein the normal extraneous influences will not destroy the proper functioning of the movable parts to induce technical errors, such as friction, a tendency of the knife edges to climb the walls of their receiving elements, binds, disalignments of parts, etc. Most of the errors enumerated, and others well known in the art, are attributable to the friction of the check rod structure as a strut, but which in practically all cases may be overcome by causing a structure to be introduced which makes this check rod structure function as a tension member.

My invention further contemplates the provision of a check rod member located between the counter weight receiving pan and the load receiving pan, which is of a unitary construction but arranged to permit of a vertically free, floating, pivotal connection with the remaining scale elements intermediate its ends. This arrangement is introduced primarily to obviate the necessity of a dual check rod structure commonly known in the art and at the same time to eliminate all binds.

From the foregoing, it will be observed that the main object of the present invention takes the form of a check rod structure associated with a pivotally mounted beam and a pan structure pivotally mounted on one end of said beam, arranged to take the distorting effects produced by an applied load placed on the pan structure on either side of its pivotal connection with the beam by means of tensile stress.

A further object of the present invention resides in a check rod structure capable of a vertically free, floating connection toward and away from the beam pivot in combination with pan structures associated with the beam and pivotally mounted thereon on its opposite ends.

A preferred embodiment of my invention is shown in the accompanying sheet of drawings wherein similar characters of reference designate corresponding parts and wherein;

Figure 1 is a vertical sectional view of the type of scale embodied in my co-pending application, Serial Number 117,129, filed August 28, 1916, but shown somewhat diagrammatically wherein is embodied the parts of the present invention, Figure 2 is a transverse, vertical, sectional view taken along line 2—2 of Figure 1, Figure 3 is a top plan view of the upper check rod element, Figure 4 is a similar view of a modified form of the same connection, Figure 5 is a modified view of the corresponding lower element, and, Figure 6 is a detail view showing the manner of connection of the lower check rod element with the scale structure.

This present invention is particularly applicable to scales employing beams of the even balance type, such as is shown in my co-pending application above referred to, but it is not necessarily limited thereto. In these drawings, there is shown a base structure 1 upon which there is pivotally mounted a beam 2 centrally carrying knife edges 3 for this purpose. There are also shown two platforms, or weight receiving pans, 4 and $4^a$, pivotally associated, by means of downwardly projecting stems 5, with the ends of the beam 2 by means of the knife edges 8. The lower ends of these stems 5 are pivotally connected with the check rod element 6 by means of a pin connection shown at $6^a$, the element 6 being in turn pivotally mounted by means of the pin 7 to the base structure 1 as shown. The pivots 3 and 7 are in direct vertical alignment and the length of the element 6 corresponds exactly with the length of the beam 2 between knife edges whereby the beam and rod 6 are always maintained in true parallelism during the oscillation of the beam.

From the structure thus far outlined, it will be apparent that if a weight 17 be applied to the right of the platter 4a, as shown in dotted outline in Figure 1, there is set up a tendency of the stem 5 to oscillate about its pivot 8. Such action is prevented by the check rod element 6 functioning as a strut which resists buckling and also resists side thrusts on the part of the stem 5, only in a minor degree. However, should the weight 17 be shifted to the opposite dotted outline position, the stem 5 would tend to oscillate in the opposite direction and thus set up a tensile stress in the rod 6. Inasmuch as a straight line is the shortest distance between two given points, it will be apparent that a pull will always tend to cause alignment of parts, eliminate side thrusts, and otherwise stabilize the structure. It is to cause the check structure to always function without any compressive strain that the present invention has been presented.

Thus, the platform 4a is shown as being provided with an upwardly extending arm 26 rigidly associated therewith by means of a screw connection 27. An auxiliary check rod element 20 is carried in superposed relation with the beam 2 and connects with this arm 26 by means of the pivotal pin and slot connection shown at 25. This auxiliary rod 20 is exactly one-half the length of the rod 6 and is pivotally connected at its opposite end, as shown at 21, with a supporting standard 23 rigidly connected to the upper end of a tower 9. The connection with the arm 23 is made adjustable, as is indicated, by means of the adjusting nuts 24, operating upon the threaded spindle 22 with which the rod 20 is connected. By these arrangements, the tilting of the beam is accompanied by a similar tilting of both the rods 6 and 20. No matter which of the dotted positions the applied weight may assume, any dislodgment on the part of the pan 4a and its stem 5 is prevented by a pull in one or the other of these rods. To make one or the other of them act as a strut is impossible, because of the slotted pivotal connection of the pan structure therewith. It will, therefore, be apparent that, irrespective of the position of the applied weight, the checking action operating to maintain the pan structure in its proper position is always accompanied by a pull in the check structure itself. By this arrangement, all buckling tendencies and climbing of the knife edges is eliminated. Likewise, side thrust and friction is reduced to a minimum.

The modified structures shown in Figures 4 and 5 have been given reference characters similar to those of Figure 1 but, in these views, the check structure itself is shown as being of a very flexible nature and in itself incapable of receiving a compressive thrust. However, these check structures are designed to resist a pull only.

In Figure 1, the tower 9 is shown at being provided with a drum 15 mounted upon a torsion strip 10 and also rigidly associated with an indicator arm 11 such as is described in detail in my co-pending application. A flexible connection 14 is properly connected intermediate its ends with the drum 15 and at these ends is connected with the beam 2 as is indicated at 13. Therefore, when the beam is moved from a central position a torsion stress is set up in the strip 10 and, as the load and applied weight are more evenly balanced, this torsion strip functions as a pendulum in causing the indicator to play over the dial 12 as the weights approach equality.

In order to eliminate the necessity of a dual check rod in the base 1, with its accompanying drawbacks, the rod 6 has been provided with an insert 28 having a slot 29. The rod 6 is provided with the proper aperture to accommodate the insert which is held in position by center punchings, as is indicated at 30. The slot 29 is at exactly 90 degrees with the longitudinal center line connecting the pivots in the ends of the rod 6 and thus the pivotal connection 7 is free to float vertically toward and away from the beam pivot 3. This arrangement is primarily introduced to overcome the human weakness of being unable to exactly bring the three pivots in the check rod 6 in exact longitudinal alignment. It is recognized that this possibly can be done but not on a commercial scale and, therefore, this floating connection has been provided.

What I claim is:

1. In a scale, a pivotally mounted beam, a pan structure pivotally associated with one end of said beam, and a check rod mechanism associated with said pan structure and said beam arranged to check the distorting effects produced by an applied load placed on said pan structure on either side of its pivotal connection with said beam by means of tensile stress.

2. In a scale, a pivotally mounted beam, a pan structure pivotally associated with one end of said beam, and a check rod mechanism comprising members operating in opposite sides of said beam and pivotally associated with said pan structure to work in unison with the oscillating of the beam whereby one or the other of said members is thrown in tension by the application of a load on said pan structure on one side or the other of its pivotal connection with said beam.

3. In a scale, a pivotally mounted beam, a pan structure pivotally associated with one end of said beam, and a check rod arrangement associated with said pan structure and said beam and arranged to receive tensile stresses only in checking the distorting effect produced by an applied load placed on said pan structure on either side of its pivotal connection with said beam.

4. In a scale, a supporting structure, a beam pivotally carried by said supporting structure, a weight receiving pan structure pivotally mounted upon one end of said beam, said pan structure including upwardly and downwardly extending rigid extremities, and a pair of pivotally supported check rods pivotally engaging with the opposite ends of said extremities whereby an oscillatory movement on the part of said pan structure produced by the placing of a load thereon on one side or the other of its pivotal connection with the beam will be checked by a pull in one or the other of said check rods.

5. In a scale, a pivotally mounted beam, a check rod mechanism pivotally mounted and movable in parallelism with said beam, pan structures pivotally connected with the ends of said beam and rod, and an auxiliary pivotally mounted check member connected with at least one of said pan structures on the opposite side of said beam and operating to overcome any compressive thrusts created by the application of a load on one of said pans out of vertical alignment with its pivot to said beam.

6. In a scale, a base, a pivotally supported pan structure, a check mechanism connected with the lower end of said pan structure, and auxiliary check means connected with said pan structure above its pivotal mounting for preventing compressive strains being imparted to said check mechanism.

7. In a scale, a base, a pivoted beam carried by said base, a pan structure pivotally carried by said beam, a member pivotally mounted beneath said beam and connected with said pan structure beneath its pivotal mounting upon said beam, and means pivotally connected with said pan structure above its pivotal mounting upon said beam for preventing compressive strains being imparted to said member.

8. In a scale, a base, a beam pivotally carried by said base, a check rod pivotally carried by said base, pan receiving stems pivotally mounted upon the ends of said beam and having their lower ends connected with said check rod, and mechanism pivotally connected to a continuation of one of said stems above the pivotal mounting of the latter upon said beam for preventing compressive thrusts being imparted to said check rod.

9. In a scale, a supporting structure, a pivotally mounted member carried by said supporting structure, a substantially centrally pivoted pan carrying structure connected at its lower end with said member, and a second pivoted member connected with the upper portions of said pan carrying structure at a point above its pivotal mounting for preventing compressive strains being imparted to said first named member.

10. In a scale, a centrally pivoted beam, a pan structure pivotally carried upon one end of said beam, a pivoted check rod connected with the lower end of said pan carrying structure, and a pivoted auxiliary check arm connected with the upper end of said pan carrying structure and serving to prevent compressive stresses being imparted to said check rod.

11. In a scale, a base, a beam pivotally carried by said base, a check rod pivoted to oscillate in parallelism with said beam, a pan supporting structure pivotally carried by one end of said beam, said structure having its lower end pivotally connected with said check rod, and an auxiliary check arm pivotally connected with the upper end of said pan carrying structure and arranged to oscillate in unison and parallelism with said beam and check rod.

12. In a scale, a base, a beam pivotally carried by said base, a check rod pivotally carried by said base and movable in parallelism with said beam, a pan supporting stem pivotally mounted upon one end of said beam and having its lower end pivotally connected with said check rod, a weight receiving pan carried by said stem, a rigid standard carried by said pan and an auxiliary check arm pivotally carried upon a fixed member, above said pan, said arm having its outer end pivotally secured to the upper end of said standard.

13. In a scale, a base, a beam pivotally mounted upon said base, a check rod pivotally connected with said base and movable in parallelism with said beam, a pan structure pivotally mounted upon said beam and having its lower end connected with said check rod, an auxiliary check arm pivotally mounted above said beam and having its free end connected with the upper portions of said pan structure, whereby through the medium of the latter, said beam, check rod and auxiliary check arm will be caused to oscillate simultaneously and uniformly.

14. The structure as specified in claim 13, in combination with means for adjusting the fixed pivot of the auxiliary check arm.

15. In a scale, a pivotally mounted beam, a unitary check rod, means for forming link connections between corresponding ends of said beam and said rod, and a vertically free, floating pivotal connection for said rod intermediate its ends and in vertical alignment with said beam pivot.

16. In a scale, a pivotally mounted beam, a unitary check rod, means for forming link connections between corresponding ends of said beam and said rod, and a pin and vertical slot pivotal mounting for said rod intermediate its ends and in vertical alignment with said beam pivot to permit a floating movement of said rod toward or away from said beam.

17. In a scale, a base, a beam pivotally mounted thereon, a standard arm in vertical alignment with said beam pivot, a unitary check rod having a vertical slot intermediate its ends for pivotal connection with said arm, link connections between corresponding ends of said beam and said rod, and means for pivotally connecting said rod and said arm.

In testimony whereof I affix my signature.

WALTER S. SMITH.